United States Patent
Sprainis et al.

(10) Patent No.: US 7,857,273 B2
(45) Date of Patent: Dec. 28, 2010

(54) PLATE FOR A COMPRESSIBLE ELASTOMERIC SPRING

(75) Inventors: Ronald J. Sprainis, Springfield, OR (US); Michael E. Ring, Saint John, IN (US); Bradley Anderson, Des Plaines, IL (US); Jonathon Marlow, Hobart, IN (US)

(73) Assignee: WABTEC Holding Corp., Wilmerding, PA (US)

( * ) Notice: Subject to any disclaimer, the term of this patent is extended or adjusted under 35 U.S.C. 154(b) by 82 days.

(21) Appl. No.: 12/150,926

(22) Filed: May 1, 2008

(65) Prior Publication Data

US 2008/0283720 A1    Nov. 20, 2008

Related U.S. Application Data

(60) Provisional application No. 60/926,987, filed on May 1, 2007.

(51) Int. Cl.
 *F16F 1/40* (2006.01)
(52) U.S. Cl. .................. 248/300; 267/141.1; 213/43
(58) Field of Classification Search ............. 248/300, 248/200, 618, 111, 56; 267/141.1, 153; 213/40 R, 213/43
See application file for complete search history.

(56) References Cited

U.S. PATENT DOCUMENTS

| | | | |
|---|---|---|---|
| 909,874 A * | 1/1909 | Danielson | 248/235 |
| 2,140,441 A * | 12/1938 | Clark | 248/27.3 |
| 3,279,048 A * | 10/1966 | Grove et al. | 29/432 |
| 4,198,037 A | 4/1980 | Anderson | |
| 5,335,403 A * | 8/1994 | Jensen | 29/896.91 |
| 5,351,844 A | 10/1994 | Carlstedt | |
| 5,702,076 A * | 12/1997 | Humber | 248/57 |
| 6,113,084 A * | 9/2000 | Norkus et al. | 267/292 |
| 6,276,674 B1 * | 8/2001 | Randell | 267/141.4 |
| 6,796,335 B1 * | 9/2004 | Hubbard et al. | 138/106 |
| 7,258,243 B2 | 8/2007 | Ring et al. | |

FOREIGN PATENT DOCUMENTS

| DE | 19 93 283 | | 9/1968 |
|---|---|---|---|
| DE | 1993283 | * | 9/1968 |
| GB | 752 962 | | 7/1956 |

* cited by examiner

*Primary Examiner*—Anita M King
(74) *Attorney, Agent, or Firm*—James Ray & Assoc

(57) ABSTRACT

A plate for a compressible elastomeric spring is formed from a predetermined material and has each of a first substantially flat surface, an opposed second substantially flat surface, a predetermined thickness and a predetermined shape. Prongs are provided on at least one surface of the plate and extend outwardly at a predetermined angle relative thereto for mechanically interlocking the plate with an axial end an abutting elastomeric pad. Prongs may have trapezoidal shape. An axial aperture may be also provided with the prongs located on or in close proximity to a peripheral edge of the apertures. Prongs may be also provided on the opposed surface of the plate for mechanically interlocking the plate with an axial end of another abutting elastomeric pad. Annular ring-like projections are also provided for mechanically interlocking the plate to at least one elastomeric pad.

29 Claims, 5 Drawing Sheets

PLATE FOR A COMPRESSIBLE ELASTOMERIC SPRING

CROSS-REFERENCE TO RELATED APPLICATIONS

This application is related to and claims priority from Provisional Patent Application Ser. No. 60/926,987 filed on May 1, 2007. This application is further closely related to co-pending U.S. Ser. No. 12/150,809 entitled "Compressible Elastomeric Spring", to co-pending U.S. Ser. No. 12/150,928 entitled "Elastomeric Pad For A Compressible Elastomeric Spring", to co-pending U.S. Ser. No. 12/150,929 entitled "Method of Making Compressible Elastomeric Spring", to co-pending U.S. Ser. No. 12/150,925 entitled "Method Of Making Elastomeric Pad For A Compressible Elastomeric Spring", to co-pending U.S. Ser. No. 12/150,777 entitled "Combination Yoke and Elastomeric Draft Gear", to co-pending U.S. Ser. No. 12/150,808 entitled "Combination Yoke and Elastomeric Draft Gear Having A Friction Mechanism", and to co-pending U.S. Ser. No. 12/150,927 entitled "Elastomeric Draft Gear Having A Housing", filed concurrently herewith. These applications are being assigned to the assignee of the present invention and the disclosures of these co-pending applications are hereby incorporated by reference thereto.

FIELD OF THE INVENTION

The present invention relates, in general, to compressible elastomeric springs and, more particularly, this invention relates to a plate positioned between a pair of compressible elastomeric pads or at each end of the compressible elastomeric spring and, yet more particularly, the instant invention relates to a plate that employs novel shape and location of the prongs to improve interlocking-type mechanical bond between the plate and the abuttingly disposed compressible elasotmeric pad.

BACKGROUND OF THE INVENTION

Metal plates are commonly employed within compressible elastomeric springs to provide support for elastomeric pads that compress and extend during use as well as to define a spring column or stack. Several alternative metal plate designs are illustrated in U.S. Pat. No. 5,351,844 issued to Carlstedt and U.S. Pat. No. 4,198,037 issued to Anderson. Carlstedt specifically aims to resolve the concentricity problems of Anderson by providing a plate with a center annular boss and with a center aperture formed through the boss so as to form a central interlocking-type mechanical bond with a central projection extending from one end of the elastomeric pad during the forming process.

However, there is a continuing need for an improved interlocking-type mechanical bond between a metal plate and the compressible elasotmeric pad so as to enable the spring to absorb and cushion higher impact loads.

SUMMARY OF THE INVENTION

In accordance with one aspect, the invention provides a plate for a compressible elastomeric spring that includes a pad defining a central axis and having a peripheral side surface and a pair of axial ends. Each of the pair of axial ends having a flat surface thereof disposed normal to such central axis. The plate is formed from a predetermined material and has each of a first substantially flat surface, an opposed second substantially flat surface, a predetermined thickness and a predetermined shape. A predetermined plurality of prongs are at least one of formed integrally with the plate like member and secured to one substantially flat surface of the plate like member. Each of the predetermined plurality of prongs has a trapezoidal shape and extends outwardly at a predetermined angle relative to the one substantially flat surface for mechanically interlocking the plate like member with an axial end of such pad abutting the one surface.

In accordance with another aspect of the invention, there is provided a plate for a compressible elastomeric spring that includes a pad defining a central axis and having a peripheral side surface and a pair of axial ends. Each of the pair of axial ends having a flat surface thereof disposed normal to such central axis. The plate is formed from a predetermined material and has each of a first substantially flat surface, an opposed second substantially flat surface, a predetermined thickness and a predetermined shape. An axial aperture is formed through the plate like member concentric with such central axis. A predetermined plurality of prongs are at least one of formed integrally with the plate like member and secured to one substantially flat surface thereof. The predetermined plurality of prongs are positioned at least one of on a peripheral edge of the axial aperture and in close proximity thereto. Each of the predetermined plurality of prongs extends outwardly at a predetermined angle relative to the one substantially flat surface of the plate like member for mechanically interlocking the plate with an axial end of such pad abutting the one substantially flat surface.

In accordance with yet another aspect, the invention provides a plate for a compressible elastomeric spring. The spring includes a predetermined plurality of elastomeric pads disposed coaxially and in series with each other to form a multi-tiered stack having a central longitudinal axis and a predetermined neutral height. Each pad compresses along such central axis during cushioning of dynamic impact forces causing reduction in such predetermined neutral height of such stack, such each pad having a peripheral surface and a pair of axial ends, each end having a flat surface thereof disposed normal to such central axis. The plate is positionable between a pair of pads and includes a plate like member formed from a predetermined material and having each of a first substantially flat surface, an opposed second substantially flat surface, a predetermined thickness and a predetermined shape. A predetermined plurality of first prongs are at least one of formed integrally with the plate like member and secured to the first substantially flat surface of the plate like member. Each of the predetermined plurality of first prongs has a trapezoidal shape and extending outwardly at a first predetermined angle relative to the first substantially flat surface of the plate like member for mechanically interlocking the plate with one pad abutting the first substantially flat surface of the plate like member. A plurality of second prongs are at least one of formed integrally with the plate like member and secured to the opposed second substantially flat surface of the plate like member. Each of the predetermined plurality of second prongs has a trapezoidal shape and extending outwardly at a second predetermined angle relative to the second substantially flat surface of the plate like member for mechanically interlocking the plate with an opposed pad abutting the second substantially flat surface of the plate.

OBJECTS OF THE INVENTION

It is, therefore, one of the primary objects of the present invention to provide a plate that can be positioned between a pair of elastomeric pads or at the end of a compressible elastomeric spring.

Another object of the present invention is to provide a plate for a compressible elastomeric spring that employs a plurality of trapezoidal-shaped center prongs located on one surface of the plate for mechanically interlocking the plate with an abutting axial end of the compressible elastomeric pad.

Yet another object of the present invention is to provide a plate for a compressible elastomeric spring that employs a plurality of center prongs located on a peripheral edge of an axial aperture formed through the plate.

A further object of the present invention is to provide a plate for a compressible elastomeric spring that employs a plurality of annular projections for mechanical attachment of the plate to an abutting elastomeric pad.

Yet a further object of the present invention is to provide a plate for a compressible elastomeric spring that employs a first plurality of center prongs located on one surface thereof and a second plurality of center prongs located on an opposed surface thereof for mechanically interlocking the plate with abutting axial ends of a pair of elastomeric pads.

An additional object of the present invention is to provide a plate for a compressible elastomeric spring that can be easily aligned with other plates during forming process of the compressible elastomeric spring.

Another object of the present invention is to provide a plate for a compressible elastomeric spring that is inexpensive to manufacture.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 2:
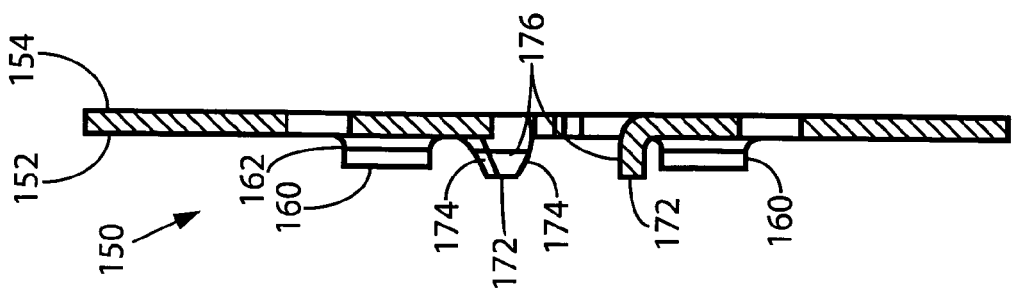
FIG. 2 is an end view of the plate of FIG. 1.

Prior to proceeding to the more detailed description of the present invention, it should be noted that, for the sake of clarity and understanding, identical components which have identical functions have been identified with identical reference numerals throughout the several views illustrated in the drawing figures.

The best mode for carrying out the invention is presented in terms of its presently preferred embodiments, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The present invention provides a plate which can be positioned at one end of the elastomeric spring or positioned between a pair of elastomeric pads. The various use of the plate of the present invention are disclosed in the co-pending U.S. Ser. No. 12/150,809 entitled "Compressible Elastomeric Spring", co-pending U.S. Ser. No. 12/150,777 entitled "Combination Yoke and Elastomeric Draft Gear", and co-pending U.S. Ser. No. 12/150,808 entitled "Combination Yoke and Elastomeric Draft Gear Having A Friction Mechanism", and to co-pending U.S. Ser. No. 12/150,927 entitled "Elastomeric Draft Gear Having A Housing".

Figure 1:
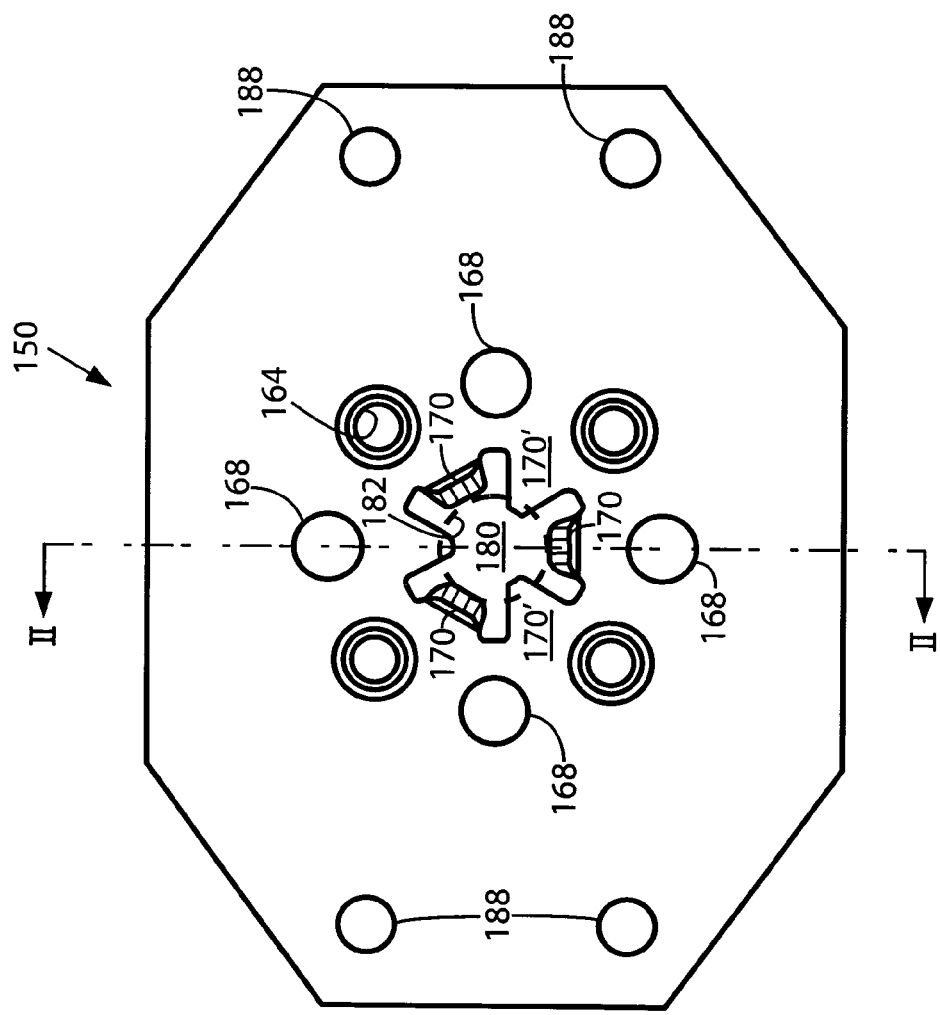
FIG. 1 is a planar view of a plate which is constructed in accordance with one embodiment of the present invention.

Reference is now made, to FIGS. 1-2, wherein there is shown a plate, generally designated as 150. The plate 150 is provided for positioning at the end of the spring 100 or 102 as disclosed in the co-pending U.S. Ser. No. 12/150,809 entitled "Compressible Elastomeric Spring". Briefly, the pad 110 has a pair of axial ends 114 and 116, each having a flat end surface 118, 120 respectively.

The plate 150 is a plate like member having each of a first substantially flat surface 152 and an opposed second substantially flat surface 154. The plate 150 is formed from a predetermined material. The presently preferred predetermined material is metal and, more particularly, such as steel. The plate 150 has a predetermined thickness which is substantially uniform thickness throughout. The plate 150 further has a predetermined shape. Each of the predetermined thickness and predetermined shape of the plate 150 depend on its specific use and method of manufacturing as well as on the design of the abutting elastomeric pad 110. By way of an example only of FIG. 1, the plate 150 is illustrated as having a generally octagonal shape produced by mitering each corner of a rectangle.

As is conventional, a predetermined plurality of raised projections 160 are provided, each defining a body 162 secured to or formed integral with one surface, shown as the first surface 152 in FIG. 2, of the plate 150 and extend outwardly therefrom. An aperture 164 is formed through a respective projection body 162 and further through the plate like member for mechanically interlocking the plate 150 with a respective axial end 114, 116 abutting the first surface 152. As is also conventional, the projection 160 has an annular shape. The projection 160 with the aperture 164 is simply and cost effectively formed by a stamping method from a presently preferred steel material. The outer diameter of the body 162 and the diameter of the aperture 164 are determined based on the material and design of the pad 110 to allow flow of such material into the aperture 164 and around the body 162 during cold forming process of such spring 100, 102. Thus, after forming the spring 100, 102, the projections 160 extend into the thickness of the pad 110 and provide mechanical interlocking of the plate 150 with the pad 110 in an adhesive free manner. The height of each projection 160 is predetermined based on a particular application. For example, the height may be determined based on the maximum compression travel (solid height) of the pad 110 to prevent its over-compression. It is also contemplated within the present invention that at least one of the predetermined pluralities of apertures 160 may have a distinct height.

As best shown in FIG. 1, the projections 160 are positioned in a predetermined pattern, which is preferably circular. Furthermore, the projections 160 are positioned at equal angles from each other at a constant radius from a central axis of the plate and their quantity is selected to provide for lateral uniformity of the spring 100, 102 during operation.

When a pair of plate like members 150 are to be positioned in a manner wherein their second surfaces 154 abut each other, at least a pair of projections 160 in one plate 150 may be oriented so as to engage aligned apertures 168 formed through an adjacent plate 150 for mechanically interlocking such pair of plate like members 150 therebetween. In this condition it may be advantageous to generally limit the height of such at least a pair of projections 160 in order to prevent its extension beyond the first surface 152 of the abutting plate 150. It would be appreciated that the pattern of apertures 168 will be rotated at a predetermined angle relative to the pattern of the projections 160 as is best shown in FIG. 1.

A predetermined plurality of prongs 170 at least one of formed integrally with the plate 150 and secured to one surface, shown as the first surface 152 in FIGS. 2, are also provided. According to one form of the present invention, each prong 170 has an end 172 and a pair of tapered side edges 174. The end 172 may be a sharp point providing for a triangular shape of the prong 170, however, it is presently preferred to adapt the end 172 with a predetermined width providing for a trapezoidal shape of the prong 170. Each end 172 may be also slightly concave. Each prong 170 extends outwardly at a predetermined angle relative to the first surface 152 for mechanically interlocking the plate with an abutting axial end 114 or 116 of such pad 110 when a predetermined compressible force is applied along the central axis to one end of the compressible spring unit 100, 102 during forming thereof. The trapezoidal shape enables each prong 170 to pierce the abutting axial end surface of the pad 110 and then penetrate thereinto during forming of the spring 100, 102. When the prong 170 is interlocked with the pad 110, the trapezoidal shape increases the surface contact between the prong 170 and the pad 110.

The angle of the prong 170 relative to the surface 152 is determined to enable sufficient extension of the prong 170 into the pad 110 and enable respective flow of the material of the pad 110 around the prong 170 during the cold forming process. It is presently preferred to position the prong 170 generally perpendicular relative to the surface 152 of the plate 150.

The prongs 170 are positioned at equal angles from each other relative to the central axis of the spring 100, 102 and are further positioned at a constant distance from and in close proximity to such central axis. The criticality of such arrangement is in that the prongs 170 form a generally annular raised ring having its side surface defined by the trapezoidal shape of each prong 170 which is advantageous for providing each of an axial straightness and lateral stability of the spring 100, 102. The quantity of the prongs 172 is also selected to provide for the axial straightness and lateral stability of the spring 100, 102 during operation.

The criticality of the trapezoidal shape and positioning of the prongs 170 is also disclosed in the co-pending U.S. Ser. No. 12/150,809 entitled "Compressible Elastomeric Spring".

It is contemplated in the present invention that the thickness of the prong 170 may differ from the thickness of the plate like member, for example when such plate is produced by a casting method.

According to another form of the present invention of FIGS. 1-2, the plate includes an axial aperture 180 formed therethrough concentric with the central axis of such plate 150 and wherein the each prong 170 is positioned on or in close proximity to a peripheral edge 182 of the axial aperture 180. In this arrangement, the inner surface 176 of the prong 170 is positioned generally tangential to such peripheral edge 182.

Figure 5:
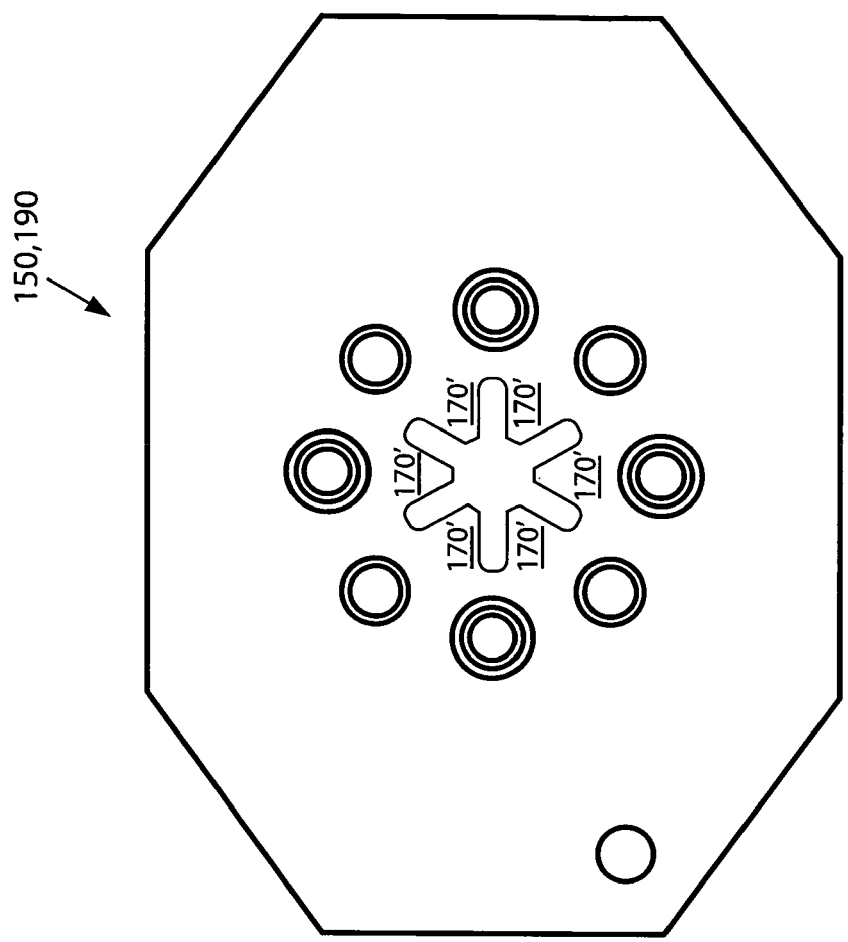
FIG. 5 is a planar view of a blank employed in manufacturing the plate of FIG. 1 or FIG. 3.

In this form of the present invention it is presently preferred for each prong 170 to be formed integral with the plate 150. In addition to the criticality of the shape and positioning of the prongs 170 for axial straightness and lateral stability of the spring 100, 102, such trapezoidally-shaped prongs 170 are advantageously formed by a simple and economical stamping process from the presently preferred steel material. As best shown in FIG. 5, which depicts a flat pattern of the plate prior to forming the prongs 170, the trapezoidal shape is naturally achieved during stamping process after positioning the prongs 170' at equal angles from each other and removing material between a pair of adjacent disposed prongs 170' for forming purposes. Thus, when the prongs 170 are formed they are disposed in a circular pattern as shown in FIG. 1.

Although, the trapezoidal shape of the prongs 170 is advantageous for above described reasons, it is within the scope of the present invention to provide different shapes of the prongs 170 in combination with the aperture 180.

To assure that each plate 150 is properly positioned during assembly of the spring 100, 102, an alignment aperture 188 is formed through the plate 150. It is further preferred to position such alignment aperture 188 in proximity to an edge of the plate 150 for ease of visual alignment identification during assembly and forming of the spring 100.

It is also within the scope of the present invention to provide a predetermined plurality of apertures 188 for mechanical fastening of the plate 150 to a respective follower block 50, 60 or the center plate 200 employed in the co-pending U.S. Ser. No. 12/150,777 entitled "Combination Yoke and Elastomeric Draft Gear" and co-pending U.S. Ser. No. 12/150,808 entitled "Combination Yoke and Elastomeric Draft Gear Having A Friction Mechanism".

Furthermore, the present invention contemplates that the prongs 170 may be securely attached to the plate 150 with any conventional method, for example, such as by a welding method. Such attachment method may be advantageous in providing the plate 150 in a form of a conventional follower block which has a thickness generally between about 1.25 inches and about 2.00 inches.

Figure 3:
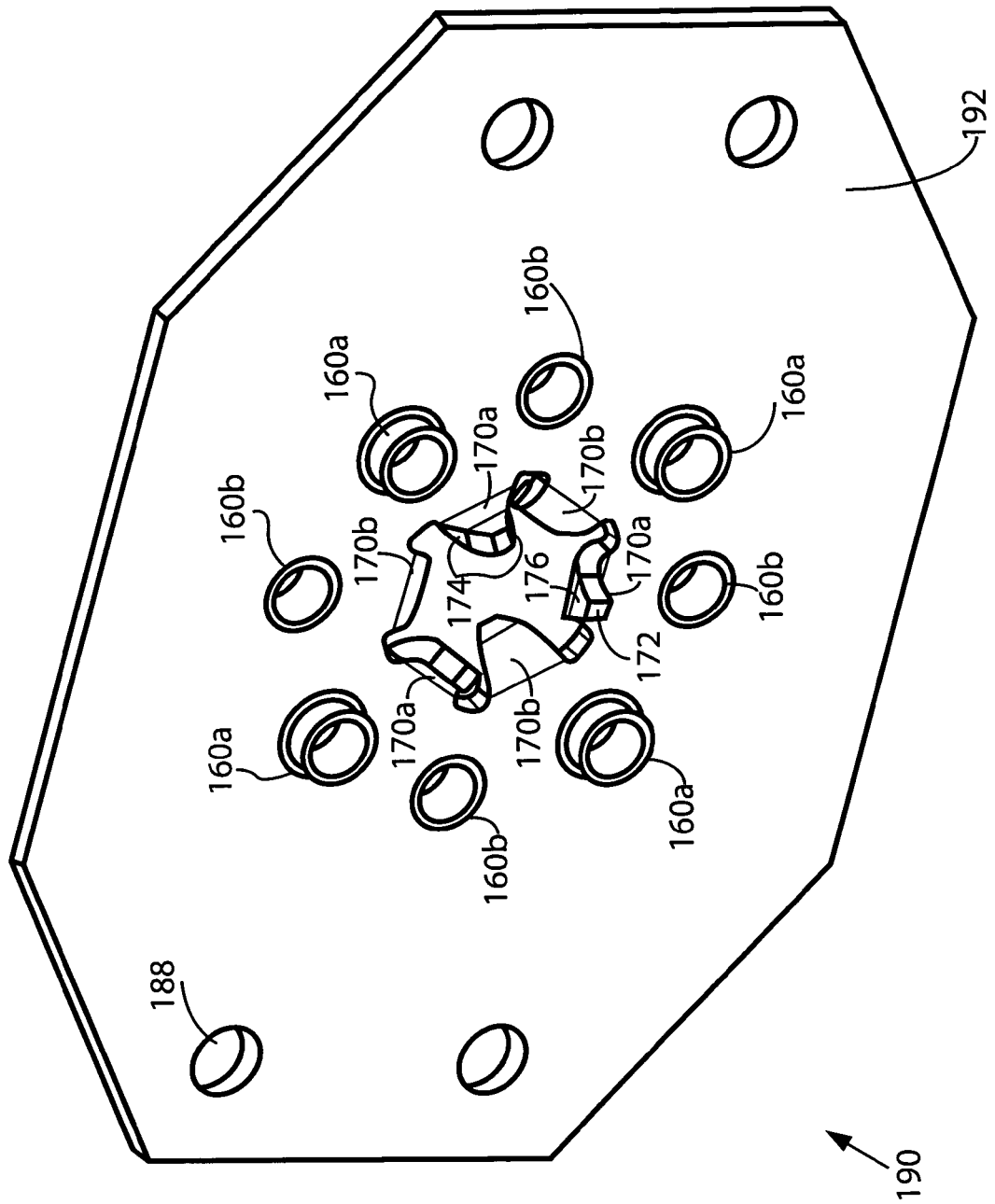
FIG. 3 is an isometric view of a plate which is constructed in accordance with another embodiment of the present invention.
Figure 4:
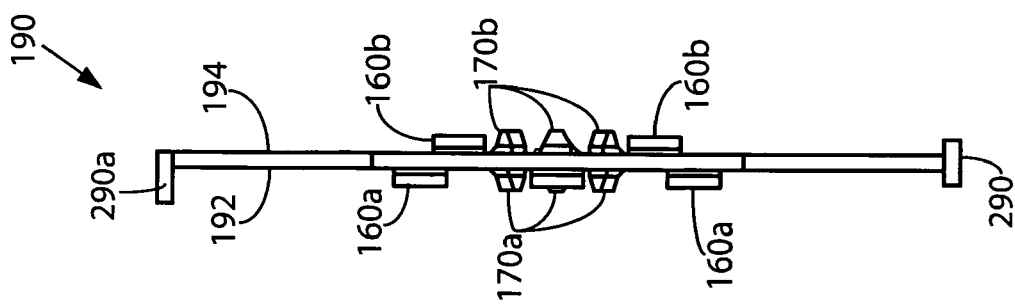
FIG. 4 is an end view of the plate of FIG. 3.
Figure 6:
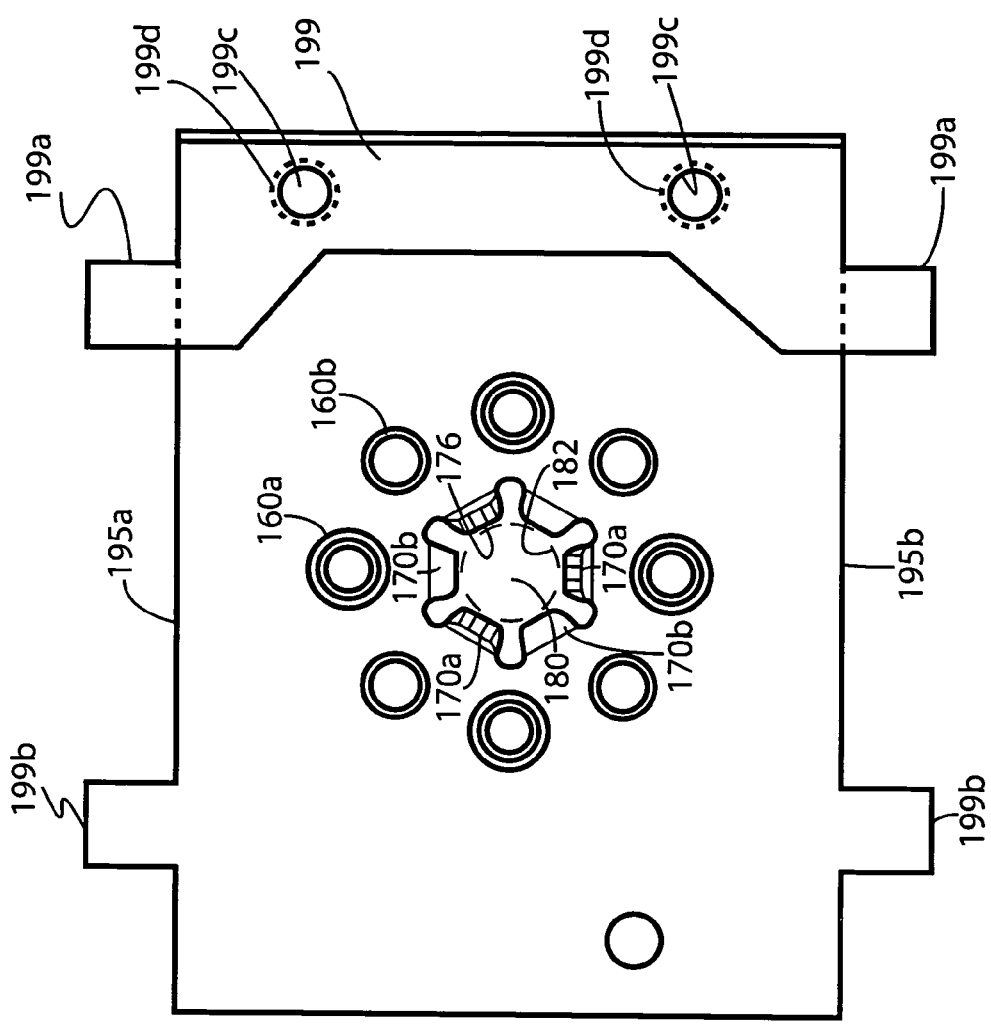
FIG. 6 is a planar view of the plate of FIG. 3, particularly illustrating axial guiding members of the present invention.
Figure 7:
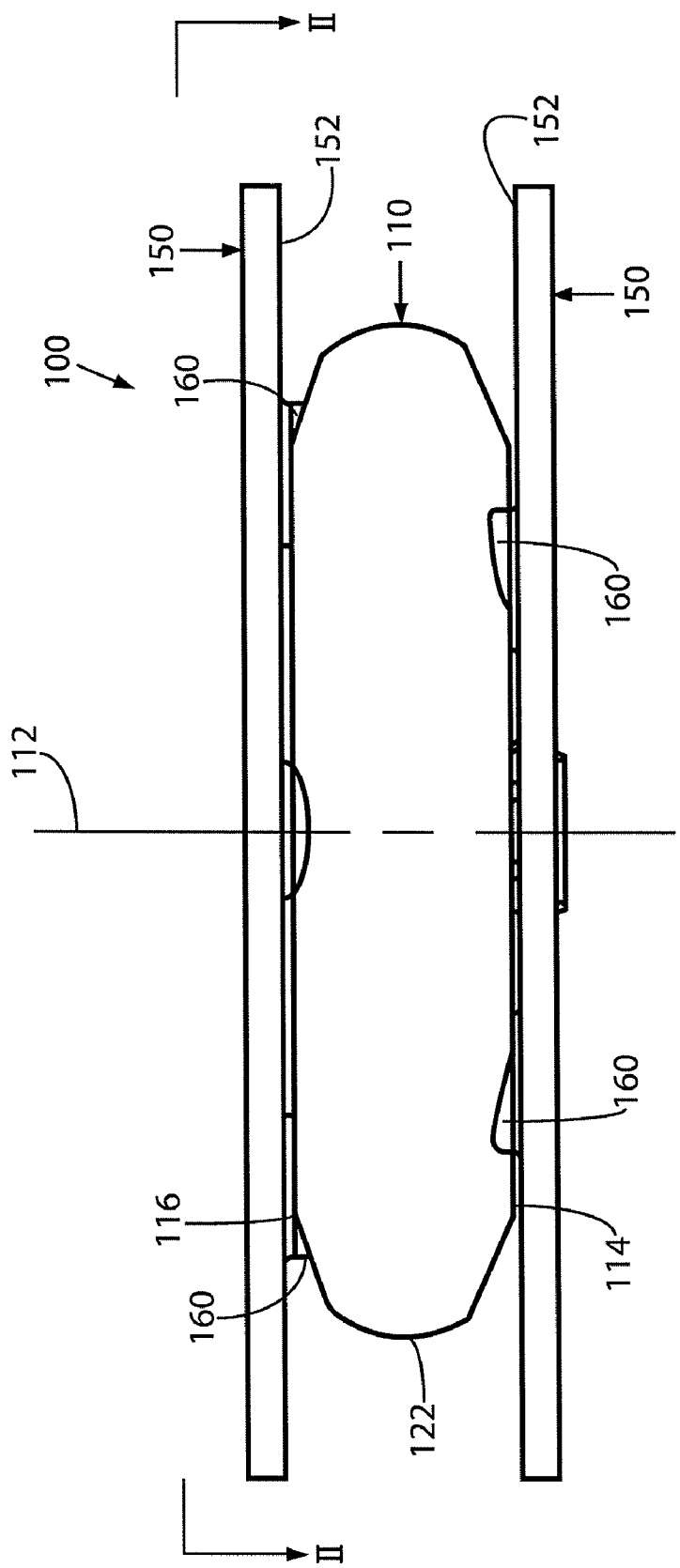
FIG. 7 is a side elevation view of a compressible elastomeric spring employing the plate of FIGS. 1-2.

Reference is now made, to FIGS. 3-5, wherein there is shown a plate, generally designated as 190. The plate 190 is constructed substantially identical to the plate 150 described above, except that the plate 190 has projections 160 and prongs 170 formed on each substantially flat surface 192, 194 thereof. Generally, the plate 190 is positioned between a pair of pads 110, although it may be also employed at least one end of the spring 100, 102, as best shown in FIG. 6 of the co-pending U.S. Ser. No. 12/150,809 entitled "Compressible Elastomeric Spring". For the sake of reader's convenience, the projections 160 are labeled as 160a and 160b and prongs 170 are labeled as 170a and 170b.

Thus, the plate 190 includes a predetermined plurality of first projections 160a being at least one of formed integrally with the plate 190 and secured to the first surface 192 thereof. Such plurality of first projections 160a extends outwardly from the first surface 192. A predetermined plurality of second projections 160b at least one of formed integrally with the plate 190 and secured to the second surface 194 thereof. Such plurality of second projections 160b extends outwardly from the second surface 194 and are preferably disposed in an alternating manner with the plurality of first projections 160a.

The plate 190 further has a predetermined plurality of first prongs 170a being at least one of formed integrally with the plate 190 and secured to the first surface 192 thereof and extending outwardly at a predetermined angle relative to such first surface 192 thereof and a predetermined plurality of second prongs 170b at least one of formed integrally with the plate 190 and secured to the second surface 194 thereof and extending outwardly at a predetermined angle relative to such second surface 194.

The second prongs 170b are also preferably interposed in an alternating manner with the first prongs 170a. Thus, when forming the spring 100, the projections 160a, 160b and prongs 170a and 170b penetrate the respective adjacent surfaces 118, 120 of the pad 110 and extend thereinto.

Furthermore, the pluralities of projections 160a, 160b are radially aligned at a predetermined angle to the respective pluralities of prongs 170a, 170b for enhancing axial straightness and lateral stability or stiffness of the spring 100, 102.

As disclosed in the co-pending U.S. Ser. No. 12/150,777 entitled "Combination Yoke and Elastomeric Draft Gear" and the co-pending U.S. Ser. No. 12/150,808 entitled "Combination Yoke and Elastomeric Draft Gear Having A Friction Mechanism", each plate 190 may include at least a pair of members 199 for guiding axial movement of the plate 190 and, more particularly, for guiding axial movement of the spring 100, 102 during use. In accordance with one embodiment of the present invention, member 199 may be secured to the plate 190, for example by a way of fasteners passed through the aperture 199c in the member 199 an engaging a threaded aperture 199d in the plate 190, and having a pair of ends 199a extending outwardly beyond each edge 195a, 195b to be disposed horizontally when the plate 190 is installed into the yoke 20. Or, the pair of ends of the member 199 may be formed integral with the plate 190 as depicted by reference numeral 199b.

The specific location and size of such member 199 in either independent or flange form will depend on the size of the plate 190, the size of respective yoke straps 30, 40 and distance of the edge 195a, 195b therefrom.

If it is desired to provide external stops 290 for preventing over-compression of the pads 110, such stops 290 may be secured, for example by a welding method, to at least one edge of the plate 190, as best shown in FIG. 4, formed from a weldable material, such as steel. Advantageously, the solid stops 290 may be also employed for alignment purposes either with or without presence of the aligning apertures 188. Furthermore, the solid stops 290 may be sized and secured to the plate 190 in a position to abut side edges of the respective yoke strap 30, 40 for guiding purposes.

The width of the stop 290 in a direction perpendicular to the surfaces 192, 194 will depend on the solid height of the pad 110 and will further depend on the position of the stop 290. The stop 290 may be centered about the thickness of the plate 190 or may be disposed flush with one surface thereof as illustrated by reference numeral 290a.

As was described above, the projections 160a, 160b and the prongs 170a, 170b may be also employed for preventing over-compression of the pads 110 during use.

Although the present invention has been shown in terms of the plate 150, 190 manufactured from steel material by a stamping method, it will be apparent to those skilled in the art, that the present invention may be applied to materials and methods of manufacturing plates 150, 190. For example, a steel plate 150, 190 may be manufactured by a casting method to function as a follower block 50, 60 or the center plate 200 in the co-pending applications which will be between about 1.2 inches and about 2.0 inches in thickness. The plate 150, 190 may be also manufactured from a composite material, such as fiber, by a casting or molding process.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A plate for a compressible elastomeric spring including a pad defining a central axis and having a peripheral side surface and a pair of axial ends, each of the pair of axial ends having a flat surface thereof disposed normal to the central axis, said plate comprising:
   (a) a plate member manufactured from a predetermined material and having each of a first substantially flat surface, an opposed second substantially flat surface, a predetermined thickness and a predetermined shape;
   (b) a predetermined plurality of prongs at least one of formed integrally with said plate member and secured to one substantially flat surface of said plate member, each of said predetermined plurality of prongs having a trapezoidal shape and extending outwardly at a predetermined angle relative to said one substantially flat surface for mechanically interlocking said plate member with an axial end of the pad abutting said one substantially flat surface; and
   (c) said predetermined plurality of prongs disposed in a circular pattern about the central axis, whereby a surface of said each of said predetermined plurality of prongs facing the central axis is disposed tangentially to a periphery of said circular pattern.

2. The plate, according to claim 1, wherein said predetermined thickness is substantially uniform thickness throughout.

3. The plate, according to claim 1, wherein said plurality of prongs are positioned at equal angles from each other relative to the central axis.

4. The plate, according to claim 1, wherein said predetermined plurality of prongs are positioned at a constant distance from the central axis.

5. The plate, according to claim 1, wherein said predetermined plurality of prongs are positioned in proximity to the central axis.

6. The plate, according to claim 1, wherein said each prong is formed integral with said plate member.

7. The plate, according to claim 1, wherein said plate includes an axial aperture formed therethrough concentric with the central axis and wherein said each prong is positioned about a peripheral edge of said axial aperture.

8. The plate, according to claim 1, wherein said plate further includes a predetermined plurality of projections at least one of secured to said one surface of said plate member and formed integral therewith, said predetermined plurality of projections extending outwardly from said one surface and a plurality of apertures, each of said plurality of apertures formed through each of a respective projection and through said plate member for mechanically interlocking said plate with the pad abutting said one substantially flat surface.

9. The plate, according to claim 8, wherein each of said predetermined plurality of projections has an annular shape.

10. The plate, according to claim 8, wherein said predetermined plurality of projections are positioned at equal angles from each other at a constant radius from the central axis.

11. The plate, according to claim 8, wherein said predetermined plurality of projections are aligned in a predetermined pattern relative to said predetermined plurality of prongs.

12. A plate engageable with a compressible elastomeric spring including a pad defining a central axis and having a peripheral surface and a pair of axial ends, each of the pair of axial ends having a flat surface thereof disposed normal to the central axis, said plate comprising:
(a) a plate member manufactured from a predetermined material and having each of a first substantially flat surface, an opposed second substantially flat surface, a predetermined thickness and a predetermined shape;
(b) an axial aperture formed through said plate member concentric with the central axis; and
(c) a predetermined plurality of prongs at least one of formed integrally with said plate member and secured to one substantially flat surface thereof, said predetermined plurality of prongs positioned about a peripheral edge of said axial aperture and extending outwardly at a predetermined angle relative to said one substantially flat surface of said plate member for mechanically interlocking said plate with an axial end of the pad abutting said one substantially flat surface, wherein an inner surface of each of said predetermined plurality of prongs facing said axial aperture is disposed tangentially to a periphery of said axial aperture.

13. The plate, according to claim 12, wherein said each of said predetermined plurality of prongs has a trapezoidal shape.

14. A plate for a compressible elastomeric spring including a predetermined plurality of elastomeric pads disposed coaxially and in series with each other to form a multi-tiered stack having a central axis and a predetermined neutral height, whereby each pad compresses along the central axis during cushioning of dynamic impact forces causing reduction in the predetermined neutral height of the stack, the each pad having a peripheral surface and a pair of axial ends, each of the pair of axial ends having a flat surface thereof disposed normal to the central axis, said plate comprising:
(a) a plate member manufactured from a predetermined material and having each of a first substantially flat surface, an opposed second substantially flat surface, a predetermined thickness and a predetermined shape;
(b) a predetermined plurality of first prongs at least one of formed integrally with said plate member and secured to said first substantially flat surface of said plate member, each of said predetermined plurality of first prongs having a trapezoidal shape and extending outwardly at a first predetermined angle relative to said first substantially flat surface of said plate member for mechanically interlocking said plate with one pad abutting said first substantially flat surface of said plate member;
(c) a predetermined plurality of second prongs at least one of formed integrally with said plate member and secured to said opposed second substantially flat surface of said plate member, each of said predetermined plurality of second prongs having a trapezoidal shape and extending outwardly at a second predetermined angle relative to said second substantially flat surface of said plate member for mechanically interlocking said plate with an opposed pad abutting said second substantially flat surface of said plate; and
(d) said predetermined plurality of first prongs and said predetermined plurality of second prongs disposed in a circular pattern about the central axis, whereby a surface of said each of said predetermined plurality of first prongs and said predetermined plurality of second prongs facing the central axis is disposed tangentially to a periphery of said circular pattern.

15. The plate, according to claim 14, wherein said predetermined plurality of said second prongs positioned in an alternating manner with said predetermined plurality of said first prongs.

16. The plate, according to claim 14, wherein said predetermined plurality of said first and said second prongs have a substantially identical shape.

17. The plate, according to claim 14, wherein each of said first predetermined angle and said second predetermined angle is generally about ninety degrees.

18. The plate, according to claim 14, wherein said predetermined plurality of said first and second prongs are located at equal angles from each other.

19. The plate, according to claim 14, wherein said predetermined plurality of said first and said second prongs are located at a constant distance from the central axis.

20. The plate, according to claim 14, wherein said plate includes:
(a) a predetermined plurality of first projections at least one of formed integrally with said plate member and secured to said first substantially flat surface of said plate member, each of said predetermined plurality of first projections extending outwardly from said first substantially flat surface and include a plurality of first apertures, each of said plurality of first apertures formed through each of a respective first projection and through said plate member; and
(b) a plurality of second projections at least one of formed integrally with said plate member and secured to said second substantially flat surface of said plate member, each of said predetermined plurality of second projections extending outwardly from said second substantially flat surface and include a plurality of second apertures, each of said plurality of second apertures formed through each of a respective second projection and through said plate member.

21. The plate, according to claim 20, wherein said predetermined plurality of second projections are located in an alternating manner with said predetermined plurality of first projections.

22. The plate, according to claim 20, wherein said predetermined plurality of said first and said second projections are formed at equal angles from each other and at a constant radius from a center of said plate.

23. The plate, according to claim 14, wherein said plate further includes means for preventing over-compression of the predetermined plurality of elastomeric pads.

24. The plate, according to claim 23, wherein said over-compression preventing means includes at least one stop at least one of secured to and formed integral with a predetermined portion of said plate member.

25. The plate, according to claim 14, wherein said plate further includes means for guiding axial movement of said plate during use.

26. The plate, according to claim 25, wherein said axial guiding means includes a pair of flanges at least one of formed integral with and rigidly secured to a predetermined portion of said plate member.

27. A plate for a compressible spring unit including a predetermined plurality of elastomeric pads disposed coaxially and in series with each other to form a multi-tiered stack having a central axis and a predetermined neutral height, whereby each pad compresses along the central axis during cushioning of dynamic impact forces causing a reduction in the predetermined neutral height of the stack, the each pad having a peripheral surface and a pair of axial ends, each of the pair of ends having a substantially flat surface thereof disposed normal to the central axis, said plate comprising:

(a) a plate member manufactured from a predetermined material and having each of a first substantially flat surface, an opposed second substantially flat surface, a predetermined thickness and a predetermined shape;
(b) an axial aperture formed through said plate member concentric with the central axis;
(c) a plurality of first prongs at least one of formed integrally with said plate member and secured to said first substantially flat surface thereof, each of said predetermined plurality of first prongs positioned about a peripheral edge of said axial aperture and extending outwardly at a first predetermined angle relative to said first substantially flat surface of said plate member for mechanically interlocking said plate with one pad abutting said first substantially flat surface of said plate member;
(d) a plurality of second prongs at least one of formed integrally with said plate member and secured to said second substantially flat surface thereof, each of said predetermined plurality of second prongs are positioned about said peripheral edge of said axial aperture and extending outwardly at a second predetermined angle relative to said second substantially flat surface of said plate member for mechanically interlocking said plate with an opposed pad abutting said second substantially flat surface of said plate member; and
(e) each of said predetermined plurality of first prongs and said predetermined plurality of second prongs disposed in a circular pattern about the central axis, whereby a surface of said each of said predetermined plurality of first prongs and said predetermined plurality of second prongs facing said axial aperture is disposed tangentially to a periphery of said axial aperture.

28. A plate for a compressible elastomeric spring including a predetermined plurality of elastomeric pads disposed coaxially and in series with each other to form a multi-tiered stack having a central axis and a predetermined neutral height, whereby each pad compresses along the central axis during cushioning of dynamic impact forces causing reduction in the predetermined neutral height of the stack, the each pad having a peripheral surface and a pair of axial ends, each of the pair of axial ends having a flat surface thereof disposed normal to the central axis, said plate comprising:
    (a) a plate member manufactured from a predetermined material and having each of a first substantially flat surface, an opposed second substantially flat surface, a predetermined thickness and a predetermined shape;
    (b) a predetermined plurality of first prongs at least one of formed integrally with said plate member and secured to said first substantially flat surface of said plate member, each of said predetermined plurality of first prongs having a trapezoidal shape and extending outwardly at a first predetermined angle relative to said first substantially flat surface of said plate member for mechanically interlocking said plate with one pad abutting said first substantially flat surface of said plate member; a predetermined plurality of second prongs at least one of formed integrally with said plate member and secured to said opposed second substantially flat surface of said plate member, each of said predetermined plurality of second prongs having a trapezoidal shape and extending outwardly at a second predetermined angle relative to said second substantially flat surface of said plate member for mechanically interlocking said plate with an opposed pad abutting said second substantially flat surface of said plate;
    (c) a predetermined plurality of first projections at least one of formed integrally with said plate member and secured to said first substantially flat surface of said plate member, each of said predetermined plurality of first projections extending outwardly from said first substantially flat surface and include a plurality of first apertures, each of said plurality of first apertures formed through each of a respective first projection and through said plate member;
    (d) a predetermined plurality of second projections at least one of formed integrally with said plate member and secured to said second substantially flat surface of said plate member, each of said predetermined plurality of second projections extending outwardly from said second substantially flat surface and include a plurality of second apertures, each of said plurality of second apertures formed through each of a respective second projection and through said plate member; and
    (e) each of said predetermined plurality of first prongs and said predetermined plurality of second prongs disposed in a circular pattern about the central axis, whereby a surface of said each of said predetermined plurality of first prongs and said predetermined plurality of second prongs facing the central axis is disposed tangentially to a periphery of said circular pattern.

29. A plate for a compressible elastomeric spring including a predetermined plurality of elastomeric pads disposed coaxially and in series with each other to form a multi-tiered stack having a central axis and a predetermined neutral height, whereby each pad compresses along the central axis during cushioning of dynamic impact forces causing reduction in the predetermined neutral height of the stack, the each pad having a peripheral surface and a pair of axial ends, each of the pair of axial ends having a flat surface thereof disposed normal to the central axis, said plate comprising:
    (a) a plate member formed from a predetermined material and having each of a first substantially flat surface, an opposed second substantially flat surface, a predetermined thickness and a predetermined shape;
    (b) a predetermined plurality of first prongs at least one of formed integrally with said plate member and secured to said first substantially flat surface of said plate member, each of said predetermined plurality of first prongs having a trapezoidal shape and extending outwardly at a first predetermined angle relative to said first substantially flat surface of said plate member for mechanically interlocking said plate with one pad abutting said first substantially flat surface of said plate member, a predetermined plurality of second prongs at least one of formed integrally with said plate member and secured to said opposed second substantially flat surface of said plate member, each of said predetermined plurality of second prongs having a trapezoidal shape and extending outwardly at a second predetermined angle relative to said second substantially flat surface of said plate member for mechanically interlocking said plate with an opposed pad abutting said second substantially flat surface of said plate;
    (c) a pair of flanges at least one of formed integral with and rigidly secured to a predetermined portion of said plate member; and
    (d) each of said predetermined plurality of first prongs and said predetermined plurality of second prongs disposed in a circular pattern about the central axis, whereby a surface of said each of said predetermined plurality of first prongs and said predetermined plurality of second prongs facing the central axis is disposed tangentially to a periphery of said circular pattern.

* * * * *